United States Patent [19]
Shimada et al.

[11] Patent Number: 5,498,663
[45] Date of Patent: Mar. 12, 1996

[54] POWDER COATING MATERIALS FOR PRODUCING CREPE-LIKE COATINGS, PREPARATION AND USE THEREOF

[75] Inventors: Eiji Shimada; Kenzo Maeda, both of Yokohama; Shingo Okamoto, Fujisawa, all of Japan

[73] Assignee: Nippon Oil and Fats Co., Ltd., Tokyo, Japan

[21] Appl. No.: 208,608

[22] Filed: Mar. 9, 1994

Related U.S. Application Data

[62] Division of Ser. No. 885,479, May 19, 1992, Pat. No. 5,321,063.

[30] Foreign Application Priority Data

May 28, 1991 [JP] Japan ........................... 3-124057
Mar. 31, 1992 [JP] Japan ........................... 4-77834

[51] Int. Cl.⁶ ........................... C09D 5/00; C09D 5/28
[52] U.S. Cl. ........................... 525/54.3; 524/37; 524/907; 525/523; 428/407
[58] Field of Search ........................... 524/37, 38, 39, 524/40, 41, 904; 525/418, 54.3, 523; 428/407

[56] References Cited

U.S. PATENT DOCUMENTS 3,972,844   8/1976   Morosawa et al. ........................... 524/904

*Primary Examiner*—Jeffrey Mullis
*Attorney, Agent, or Firm*—Flynn, Thiel, Boutell & Tanis

[57] ABSTRACT

A powder coating material for providing a crepe-like coating having a uniformly and densely distributed superior aesthetic appearance and having a high corrosion resistance, which is capable of forming a color distinct ridges and valleys of the wrinkle profile of the coating layer, said powder coating material consisting of a co-milled powdery product of which particle sizes are not higher than 105 μm and which is composed of (A) 95–99.5 parts by weight of a first resin component comprising a thermosetting resin solid at ordinary temperature and (B) 5–0.5 parts by weight of a second resin component comprising a thermosetting resin solid at ordinary temperature and containing 3–8% by weight of a cellulose ester, wherein the powder coating material is prepared by co-milling pelletized resin products of the components (A) and (B).

6 Claims, 2 Drawing Sheets

POWDER COATING MATERIALS FOR PRODUCING CREPE-LIKE COATINGS, PREPARATION AND USE THEREOF

This is a division of Ser. No. 07/885,479, filed May 19, 1992 now U.S. Pat. No. 5,321,063.

FIELD OF THE INVENTION

The present invention relates to a powder coating material for producing a coating which exhibits a superior visual quality and has a uniformly and densely distributed crepe-like structured pattern, to a process and apparatus for the production of such a powder coating material, to a method for coating various substrates therewith and to coated films obtained therefrom.

BACKGROUND OF THE INVENTION

With the progressive development in the field of application of powder coating materials in recent years, it has been expected eagerly to realize improvements in the visual quality of the coatings obtained from such powder coating materials. Under these circumstances, there have been proposed several powder coating materials in which an aesthetic appearance is provided by a surface irregularity in the resulting coating film.

For example, Japanese Patent Publication No. 7686/1973 discloses a powder coating material in which a powder of a resin which is solid at room temperature and has an average particle size of not higher than 200 -mesh and a melt viscosity of, at the highest, 100 poise at 100°–250° C., on the one hand, and a powder of a resin which is solid at room temperature and has an average particle size in the range from 60-mesh to 200-mesh and a melt viscosity of, at the highest, 100 poise at 100°–250° C., on the other hand, are mixed together. The coating layer formed from this powder coating material exhibits a poor aesthetic appearance of an orange peel-like pattern due to its shallow profile of surface irregularity.

In the Japanese Patent Application Kokai No. 46739/1975, a powder coating material is disclosed which is prepared by kneading a mixture composed of a powder of a thermosetting resin which is solid at room temperature and a powder of a thermoplastic resin based on a cellulose ester at such a temperature that the thermosetting resin will melt but the cellulose ester resin will not, cooling the kneaded mass and then finely pulverizing it. However, this powder coating material suffers from an insufficient distribution of the cellulose ester resin over the resulting mass of the coating material since the two powder products of the thermosetting resin and the thermoplastic cellulose ester resin are kneaded at the same temperature, so the coating layer obtained therefrom will not only reveal an unevenly distributed crepe-like pattern but also give rise to a phenomenon of such an excessive shrinkage that the substrate becomes laid bare at the "valley" portions of the wrinkling of the coating, resulting in an inferior corrosion resistance.

In the TECHNICAL DATA SHEET of the company TROY CHEMICAL, it is described that TROYKYD PTA (trademark) has been brought into market as additives for powder coating materials which provide an aesthetic appearance to the resulting coatings. However, the actual compositions of these additives are not given and, in addition, a sufficient distribution of such an additive will not be attained when added to a powder coating material due to the difficulty of attaining a uniform mixing of the two pulverous products with each other, so that the coating layer obtained therefrom may suffer from a disadvantageous phenomenon in which the substrate becomes exposed at the "valley" sites of the wrinkling coating, resulting in that not only a beautiful uniform pattern of the coating cannot be obtained but also a rusting of the substrate may occur when a ferrous substrate is used.

Furthermore, there is disclosed, in Japanese Patent Application Kokai No. 258270/1985, a powder coating material prepared by kneading a powder mixture comprising a thermosetting resin which is solid at room temperature and a thermoplastic resin based on a cellulose ether, at such a temperature that the thermosetting resin melts but the thermoplastic cellulose ether resin does not, cooling the resulting kneaded mass and then finely pulverizing it. However, this powder coating material suffers from an insufficient distribution of the cellulose ether resin over the resulting mass of the coating material, since the two powder products of the thermosetting resin and the thermoplastic cellulose ether resin are kneaded at the same temperature, so that the coating layer obtained therefrom will not only reveal an unevenly distributed wrinkle pattern but also gives rise to a phenomenon in which the substrate becomes laid bare at the "valley" sites of the wrinkling of the coating, resulting in an inferior corrosion resistance.

SUMMARY OF THE INVENTION

An object of the present invention is to solve the above-mentioned disadvantages of the prior art and to provide a powder coating material which yields a coating exhibiting a uniformly and densely distributed and aesthetically superior wrinkle pattern with excellent corrosion resistance, in which the "ridge" portions and the "valley" portions of the wrinkling coating can be distinguished by color difference.

Another object of the present invention is to provide a process for preparing such a powder coating material in an easier manner.

A further object of the present invention is to provide an apparatus for realizing the process for preparing the powder coating material.

A still further object of the present invention is to provide a method for coating a substrate with the powder coating material in an easier manner.

A further object of the present invention is to provide a particular coating which exhibits a densely and uniformly distributed and easthetically superior wrinkle pattern with excellent corrosion resistance, in which the "ridge" portions and the "valley" portions of the wrinkling coating can be distinguished by color difference.

Thus, the present invention relates to a powder coating material, a process and an apparatus for the preparation thereof, a coating method therewith and a coating therefrom, which are capable of providing the characteristic wrinkle pattern mentioned above, namely:

(1) A powder coating material for providing a crepe-like pattern coating, comprising a co-milled pulverous mass having particle sizes not higher than 105 μm, which is composed of (A) 95–99.5 parts by weight of a first resin component comprising a thermosetting resin which is solid at room temperature, for the powder coating material and (B) 5–0.5 parts by weight of a second resin component comprising a thermosetting resin which is solid at room temperature and contains 3–8% by weight of a cellulose ester, for the powder coating material.

(2) A powder coating material according to the foregoing (1), wherein the first and/or the second resin components contain the same or different coloring materials, each in an amount of 1–40% by weight.

(3) A process for the preparation of the powder coating material according to the foregoing (1) or (2), wherein
(C) 95–99.5 parts by weight of a first pelletized component, obtained by a procedure comprising kneading a thermosetting coating material resin which is solid at room temperature, at a temperature at which this resin will melt, cooling the kneaded mass and subjecting the cooled mass to a primary crushing, and
(D) 5–0.5 parts by weight of a second pelletized component, obtained by a procedure comprising kneading a thermosetting coating material resin which is solid at room temperature and contains a cellulose ester in an amount of 3–8% by weight, cooling the kneaded mass and subjecting the cooled mass to a primary crushing, are co-milled until the particle sizes of the milled powder of not higher than 105 μm are reached.

(4) A process according to the foregoing (3), wherein the second pelletized component is kneaded at a temperature at which the cellulose ester does not melt.

(5) A process according to the foregoing (3), wherein the second pelletized component is kneaded at a temperature at which the cellulose ester melts.

(6) An apparatus for preparing the powder coating material according to the foregoing (1) or (2), comprising a first hopper means for supplying the first pelletized component of a thermosetting coating resin which is solid at room temperature; a second hopper means for supplying the second pelletized component of a thermosetting coating material resin which is solid at room temperature and contains a cellulose ester; a mixer for mixing the first and the second pelletized components supplied from said first and second hopper means; and a mill means for effecting co-milling of the mixture of the pelletized components formed in the mixer.

(7) A method for preparing a crepe-like coating, comprising applying a powder coating material according to the foregoing (1) onto a substrate and heating the coated layer of the powder coating material to melt to cause curing thereof.

(8) A coating exhibiting a crepe-like pattern, which is made from the powder coating material according to the foregoing (1).

DETAILED DESCRIPTION OF THE INVENTION

Figure 1:
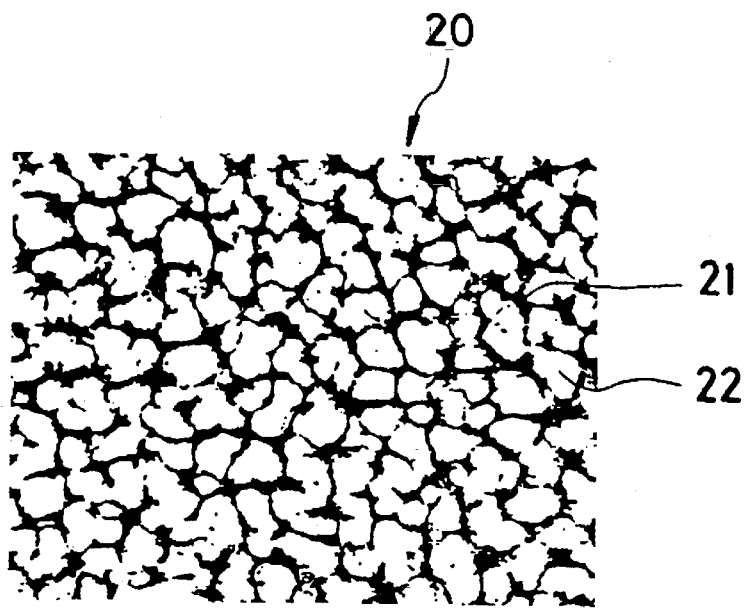
FIG. 1 shows, in a typified illustration, the crepe-like pattern of a coating film produced from a powder coating material according to the present invention in top view.

As the thermosetting resin (A), which is solid at ordinary temperature, of the first resin component for the powder coating material, there may be employed known resins of, for example, self-cross linking types and curing agent-containing types, which have been used conventionally for heat curing powder coating materials. For such resins, there may be enumerated resins which are solid at room temperature, such as epoxy resins, polyester resins, acrylic resins and fluorocarbon resins.

As the epoxy resin, there may be employed, for example, an epoxy resin having an epoxy equivalent of 450–1,000 g/eq and a melting point of 60°–110° C.

As the polyester resin, there may be employed, for example, a carboxyl group-containing polyester resin having a number average molecular weight of 1,000 to 30,000, a melting point of 60°–125° C. and an acid value of 20–200 mg KOH/g or a hydroxyl group-containing polyester resin having a number average molecular weight of 1,000 to 30,000, a melting point of 60°–125° C. and a hydroxyl value of 10–200 mg KOH/g.

As the acrylic resin, there may be employed, for example, an acrylic resin having a number average molecular weight of 1,000–30,000, a glycidyl equivalent of 200–1,500 g/eq. and a melting point of 60°–120° C.; a carboxyl group-containing acrylic resin having a number average molecular weight of 1,000–30,000, a melting point of 60°–125° C. and an acid value of 20–200 mg KOH/g; or a hydroxyl group-containing acrylic resin having a number average molecular weight of 1,000–30,000, a melting point of 60°–125° C. and a hydroxyl value of 20–300 mg KOH/g.

As the fluorocarbon resin, there may be enumerated, for example, a hydroxyl group-containing fluorocarbon resin having a number average molecular weight of 1,000–30,000, a melting point of 60°–120° C. and a hydroxyl value of 10–200 mg KOH/g.

The thermosetting resin (A) for the powder coating material may be used either individually or in a combination of two or more thereof. The first resin component may include, in addition to the thermosetting resin (A), other constituents, such as, a curing agent which is reactive with the resin components, pigments and other additives, each in an amount within a range not counteracting the object of the present invention.

For the thermosetting resin (B), which is a solid at room temperature, for use as the second resin component for the powder coating material, there may be employed the same resins as the resin (A). While the resin (B) may be the same as the resin (A), other resins having a compatibility therewith may also be used, wherein the same resin is especially preferable.

As the cellulose ester to be contained in the second resin component, it is pertinent to use those of a thermoplastic nature having melting points in the range of 80°–260° C., preferably 100°–200° C., viscosities, as determined by ASTM-D 817 (Formula A) and -D 1343, in the range of 0.01–284 poise and hydroxyl group contents in the range of 0.2–5.0% by weight, such as cellulose acetate, cellulose acetate butyrate, cellulose acetate propionate and cellulose phthalate.

Commercially available cellulose esters may also be employed for the cellulose ester, wherein there may be enumerated, as the cellulose acetate butyrate, those commercial ones, such as, CAB-551-0.01, CAB-551-0.2, CAB-531-1, CAB-500-1, CAB-553-04, CAB-381-01, CAB-381-05 and CAB-500-5 (all trademarks) of Eastman Chemical Products. As the cellulose acetate, there may be enumerated, for example, CA-394-60S, CA-398-6 and CA-398-30 (all trademarks) of Eastman Chemical Products and, for the cellulose acetate propionate, there may be exemplified, for example, CAP-482-0.5 and CAP-504-0.2 (all trademarks) of Eastman Chemical Products.

The content of the cellulose ester in the second resin component amounts to 3–8%, based on the sum weight of the thermosetting resin (B) plus the cellulose ester for the second resin component. If the content of the cellulose ester in the second resin component is short of 3% by weight or exceeds 8% by weight, a coating that exhibits a uniformly and densely distributed crepe-like structured pattern will not be obtained.

The cellulose esters may be used either singularly or in a combination of one or more of them. The second resin component may include, in addition to the thermosetting resin (B), other constituents, such as curing agents, pigments and other additives, each in an amount within the range not counteracting the object of the present invention.

For the thermosetting resin of the second resin component, those having a specific weight the same as or as close as possible to that of the thermosetting resin of the first resin component are preferable. Adjustment of the specific weight can be realized by selection of the kind of thermosetting resin (B) and the kind and content of cellulose ester and/or of other additives.

For the curing agent to be included in the first and the second resin components, there may be employed, for example, those reactive with glycidyl groups and hydroxyl groups, such as amino compounds, for example, dicyandiamide and its derivatives, imidazoles and their derivatives, melamine resins, tetramethoxymethyl glycoluryl (TMMG), β-hydroxyalkyl amides (HAA), dibasic acid dihydrazides, diaminophenylmethane and cyclic amidines; and blocked isocyanates, for example, blocked polyisocyanates blocked with a blocking agent, for example, those of polyisocyanates, such as isophorone diisocyanate, tolylene diisocyanate, xylene diisocyanate, 4,4'-diphenylmethane diisocyanate and hexamethylene diisocyanate, as well as dimers and trimers of them, and modified products by a polyhydric alcohol such as trimethylolpropane, of which the isocyanate groups are blocked by, for example, ε-caprolactam, phenol, benzyl alcohol or methyl ethyl ketoxime. For the blocked polyisocyanates, those which are solid at ordinary temperatures may beneficially be employed.

For the curing agent which is reactive with the carboxyl group or the glycidyl group of an acrylic resin, there may be enumerated glycidyl compounds, for example, terephthalic acid diglycidyl ester, p-oxybenzoic acid diglycidyl ester, triglycidyl isocyanurate (TGIC), spiro-glycol diglycidyl ether; hydantoin compounds; cyclic epoxy compounds; 1,4-bis-2'-hydroxyethoxybenzene; bis-hydroxyethyl terephthalate; copolymers of styrene and allyl alcohol; spiroglycols; tris-2-hydroxyethyl isocyanurate; a polyester resin or an acrylic resin having a hydroxyl value of 10–300 mg KOH/g, a glass transition temperature of 30°–120° C. and a number average molecular weight of 1,000–15,000; aliphatic dibasic acids such as fumaric acid, succinic acid, adipic acid, azelaic acid, sebacic acid and dodecane diacid; acid anhydrides such as phthalic anhydride, trimellitic anhydride and pyromellitic anhydride; and a polyester resin or an acrylic resin having an acid value of 10–300 mg KOH/g, a glass transition temperature of 30°–120° C. and a number average molecular weight of 1,000–15,000.

For the curing agent, those which are solid at room temperature may beneficially be employed. The amount of the curing agent in the first and second resin components may be different in accordance with each specific compound and condition etc., while an amount of 2–50%, preferably 5–30%, based on the weight of the resin, may be preferred in general.

For the coloring material to be incorporated in the first or the second resin component, there may be employed colored pigments, such as those inorganic pigments, for example, titanium dioxide, iron oxide red, iron oxide yellow and carbon black; those organic pigments, for example, phthalocyanine blue, phthalocyanine green, red pigments based on quinacridone, yellow pigments based on isoindolinone and so on; extender pigments, such as talcum, silica, calcium carbonate and barium sulfate; metal powder, such as aluminum and stainless steel; pulverous mica and so on. The coloring material may be employed in an amount of 1–40%, preferably 2–35%, based on the weight of the resin.

As other additives to be employed in the first or the second resin component, there may be enumerated, for example, UV-absorbers, thermal aging inhibitors, antifoaming agents and so on. These additives may be incorporated when required, either individually or in a combination of two or more of them.

The powder coating material for producing the wrinkled crepe-like pattern according to the present invention is prepared by co-milling the first and second resin components to a particle size of not higher than 105 μm, preferably in the range of 5 to 88 μm. If the particle size of the first and the second resin components exceeds 105 μm, practical application of the resulting powder coating material becomes difficult and, in addition, the wrinkle pattern of the coating therefrom no longer has a superior aesthetic appearance with a uniformly and densely distributed crepe-like structured pattern.

Due to the co-milling, the powder coating material according to the present invention is present as a homogeneous powder mixture in which the powdery second resin component is distributed uniformly over the mass of the powdery first resin component having the particle size mentioned above. When the powdery second resin component is not distributed uniformly over the mass of the powder coating material, a wrinkled coating with uniformly distributed crepe-like pattern will not be obtained.

The mixing proportion of the first resin component with the second resin component in the powder coating material according to the present invention is chosen such that the first resin component occupies 95–99.5 parts by weight and the second resin component constitutes the balance, namely, 5–0.5 parts by weight. If the proportion of the second resin component is less than 0.5 parts by weight, the wrinkle pattern of the resulting coating is not uniform with, in some cases, occurrences of exposed portions of the substrate surface in the "valley" of the wrinkle, resulting in an inferior corrosion resistance. If, on the other hand, the proportion exceeds 5 parts by weight, the resulting coating will reveal an undesirable appearance of an orange peel and a sufficient aesthetic wrinkle pattern is not obtained.

Below, a way of preparing the powder coating material according to the present invention is described.

For preparing the powder coating material according to the present invention, a first pelletized component (C) and a second pelletized component (D) are first prepared from the first and second resin components respectively and the so-prepared pelletized components are subjected to co-milling.

For preparing the first pelletized component (C), the thermosetting resin (A), which is solid at room temperature, for the first resin component is kneaded together with other additives in a kneader at such a temperature that the thermosetting resin (A) will melt. In case other additives are employed, it is preferable to effect a sufficient pre-mixing of all the constituents in an adequate mixer before the kneading is carried out. The kneaded mixture is then cooled and the cooled solid mass is subjected to a primary crushing for the kneading, known kneaders, such as extruder kneaders, etc., may be employed. For the primary crushing, known devices for grinding or crushing, such as, jaw crushers, hammer mills and so on, can be employed.

For preparing the second pelletized component (D), the thermosetting resin (B), which is solid at room temperature, and the cellulose ester for the second resin component are kneaded together with other additives in a kneader. It is preferable to effect a sufficient pre-mixing of all the constituents in an adequate mixer before the kneading is carried out. The kneaded mixture is then cooled and the cooled solid mass is subjected to a primary crushing. As the kneader, crusher and grinder, those which are employed in preparing the first pelletized component (C) can be employed.

The kneading of the pelletized component (D) is effected at a temperature at which the cellulose ester will or will not melt. Thus, the kneading is realized in a completely molten state of the cellulose ester or in a completely solid state of the cellulose ester. When the kneading is effected in the completely molten state of the cellulose ester, the coating obtained therefrom will exhibit a wrinkle pattern in which the interval between the neighboring "ridges" is wider than the wrinkle pattern from the powder coating material prepared by kneading the cellulose ester in the completely solid state. Therefore, if only a part of the cellulose ester is caused to melt upon the kneading, the resulting coating will exhibit a wrinkle pattern in which the interval between the neighboring "ridges" becomes irregular and a wrinkle pattern of uniform distribution becomes unattainable.

For preparing the powder coating material according to the present invention, the first and the second pelletized components (C) and (D) prepared as above are then subjected to a co-milling in a mill until particle sizes of the particles in the milled powder of not higher than 105 μm, preferably in the range of 5–88 μm are reached. The proportion of the amount of the first pelletized component (C) versus that of the second pelletized component (D) is in the range of 95–99.5 parts by weight of the component (C) versus 5–0.5 parts by weight of the component (D).

As the mill, any one permitting milling to a particle size not higher than 105 μm may be employed. Examples of such a mill include known devices for effecting grinding or milling, such as ball mills, roll crushers, hammer mills and so on. Concretely, there are found in the market, for example, Turbomill 400 (trademark) of Turbo Kogyo K.K., ACM (trademark) of Hosokawa Micron K.K. and the like.

By the incorporation of co-milling of the first and the second pelletized components (C) and (D), it is possible to prepare the powder coating material according to the present invention having a uniform distribution of the pulverous second resin component over the pulverous mass of the first resin component in an easier manner, while simultaneously attaining the easy control of the number of particles of the first resin component surrounding each particle of the second resin component. It is now made possible thereby to obtain a wrinkle pattern in the coating therefrom, thereby exhibiting a superior aesthetic appearance due to the uniform and dense distribution of the wrinkle pattern.

The powder coating material according to the present invention can be prepared easily by using an apparatus for preparing the powder coating material of the present invention, which comprises a first hopper means for supplying the first pelletized component (C); a second hopper means for supplying the second pelletized component (D); a mixer for mixing the first and the second pelletized components (C) and (D); and a mill means for effecting co-milling of the mixture of the pelletized components (C) and (D). In this apparatus, the pelletized component (C) supplied from the first hopper means at a constant rate by, for example, a screw feeder, is mixed in the mixer with the second pelletized component (D) supplied from the second hopper means at a constant rate by, for example, an autofeeder, and the thus mixed pelletized components are supplied to the mill where they are subjected to co-milling, whereby the powder coating material according to the present invention is prepared.

The practical application of the powder coating material according to the present invention can be realized by coating a substrate to be coated with the powder coating material by, for example, electrostatic powder coating, fluidized-bed coating, electrostatic fluidized-bed coating or the like, followed by heating of the coated substrate to melt the powder coating material on the substrate to thereby cause curing of the coated layer. Among the application techniques mentioned above, electrostatic powder coating is preferred. While the heating condition may depend on the specific resin components (A) and (B) employed and on the specific curing agent used and its amount, a condition of a substrate temperature of 170°–250° C. for 1–30 minutes after the coating, preferably 170°–220° C. for 10–30 minutes may be preferred in general. A suitable thickness of the coating layer may usually be 30–150 μm, preferably 50–100 μm, as the mean value between the "ridge" portions and the "valley" portions of the coating.

The substrate to be coated may be any material with no limitation for the shape and material, so long as it withstands the thermal condition upon the coating explained above. The substrate material may be, by way of exemplification, metals, glass, ceramics and so on.

The coating obtained from the powder coating material according to the present invention in the manner described above produces spontaneously a wrinkle pattern in which the "valleys" are surrounded by the "ridges" and exhibits a uniformly and densely distributed wrinkling in a form of, such as, screen mesh, with a superior aesthetic appearance, while providing at the same time an excellent corrosion resistance.

As seen in FIG. 1, which shows the wrinkle pattern of the coating formed with the powder coating material according to the present invention in the Example given afterwards in a typified illustration as top view, the coating layer 20 includes "ridges" 21 running over the coating face successively with fine "valleys" 22 being surrounded therebetween, forming as a whole a uniformly and densely distributed wrinkle pattern in a screen mesh-like form of excellent aesthetic appearance.

While the actual mechanism of formation of such a wrinkle pattern is not yet made clear, it is to be assumed that curing reaction of the resin upon heating to melting proceeds more rapidly in the part of the first resin component than in the part of the second resin component. The second resin component has a lower melt viscosity and lower curing rate than the first resin component due to the inclusion of the thermoplastic cellulose ester. Upon curing, the first resin component is subjected to a shrinkage, whereby the second resin component having a lower melt viscosity is drawn towards the location of the shrinking first resin component to form a corresponding depression, namely, the "valley" portion 22. It is thus assumed that the wrinkle pattern of the coating from the powder coating material according to the present invention is caused due to the difference in the curing rate and in the melt viscosity between the first and the second resin components.

When no coloring material is added to both the first and the second resin components or when the same coloring material is added to the first and the second resin components so as to give the same coloration to them, a wrinkle coating having a uniform hue over the entire coating layer is obtained. When, however, the two resin components are prepared with different colorations by adding a coloring material to only one of the resin components or by adding each different coloring material to each of the resin components, the resulting wrinkle coating reveals a special color pattern in which the "valley" portions 22 and the "ridge" portions 21 are distinguished with each other by the color difference.

In such color-distinct wrinkle patterns, the "ridge" portions 21 are occupied in principle by the color of the first resin component and the "valley" portions are colored by the second resin component, though some exceptions may occur. Such color-distinct wrinkle patterns exhibit a more noticeable aesthetic appearance by the combination of the color distinction with the uniform and dense wrinkle pattern.

Figure 2:
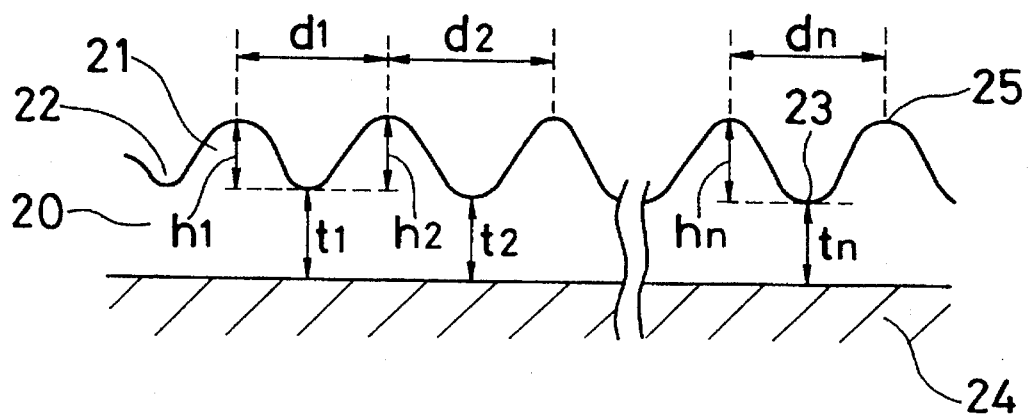
FIG. 2 shows, in a typified illustration, the crepe-like pattern of a coating film produced from a powder coating material according to the present invention in a sectional view.

FIG. 2 illustrates a typified wrinkle profile in a cross section of the coating layer 20 formed from the powder coating material according to the present invention, to show the "ridge" 21 and the "valley" 22 more visually. The coating layer 20 formed from the powder coating material according to the present invention never causes the occurrence of any portion of the substrate 24 to be laid bare, even in the deepest "valley" 23, maintaining always a minimum thickness t. The crepe-like coating according to the present invention is therefore excellent in corrosion resistance, so that no rusting occurs during long term use, even for ferrous substrates such as steel plates.

Also the distance d between one highest ridge 25 around a valley 21 to the neighboring highest ridge 25 around the adjacent valley and the ridge height h each fall within a certain range, showing a uniform and dense distribution of the wrinkle pattern. If the distance d is too small, any wrinkle pattern cannot be noticed and, on the other hand, aesthetic appearance will deteriorate if the distance d becomes too large. If the ridge height h is too low, the wrinkle pattern will not be marked and goes to an appearance of an orange peel, whereas, contrariwise, a debasement of the aesthetic appearance will result if the height h becomes too high. When the minimum thickness t of the coating layer, namely the thickness from the lowermost bottom face 23 of the coating to the surface of the substrate 24, is small, the resulting coating 20 will exhibit an inferior corrosion resistance.

It is preferable that the ridge distances $d_1, d_2, \ldots d_n$ as given in FIG. 2 are within the range of 1.0±0.2 mm and that the ridge height $h_1, h_2, \ldots h_n$ fall within the range of 40 to 180 μm. When these values are within such ranges, the coating 20 exhibits a crepe-like pattern having a superior aesthetic appearance with a uniform and dense distribution of the pattern. As to the minimum thickness of the coating layer, it is preferable that $t_1, t_2 \ldots t_n$ fall within the range of 10–30 μm, since a superior corrosion resistance of the coating layer 20 is attained thereby.

The above values for the ridge distance d, ridge height h and minimum thickness t may be attained easily when a substrate is coated with the powder coating material according to the present invention by means of the aforesaid application techniques.

The articles coated with the powder coating material according to the present invention are adapted to use as interior and outdoor construction materials, materials for instruments and so on.

As explained above, the powder coating material according to the present invention consists of a co-milled powder having a particle size not higher than 105 μm and contains the first resin component comprising a thermosetting resin which is solid at room temperature for a powder coating material and the second resin component comprising a thermosetting resin which is solid at room temperature for a powder coating material and a definite amount of a cellulose ester, in a definite proportion of the first and the second resin components, so that the powder coating material can provide a coating film which exhibits a crepe-like pattern having a superior aesthetic appearance with excellent corrosion resistance and permits color-distinction of the ridge portions and the valley portions of the coating.

According to the present invention, there is provided also an apparatus for use in preparing the powder coating material of the present invention in an easier and simple manner.

According to the present invention, beautiful aesthetic appearances of coatings can be attained by simply coating various substrates with the powder coating materials according to the present invention without necessitating laborious additional work steps, such as in situ mixing, etc.

Furthermore, it is possible according to the present invention, to obtain crepe-like coatings having superior aesthetic appearances with uniform and dense distribution of the wrinkle pattern, together with a possibility of color-distinction of the ridge portions and the valley portions of the wrinkle profile, in addition to a superior corrosion resistance.

PREFERRED EMBODIMENTS OF THE DISCLOSURE

Below, the present invention will further be described by way of Examples.

Figure 3:
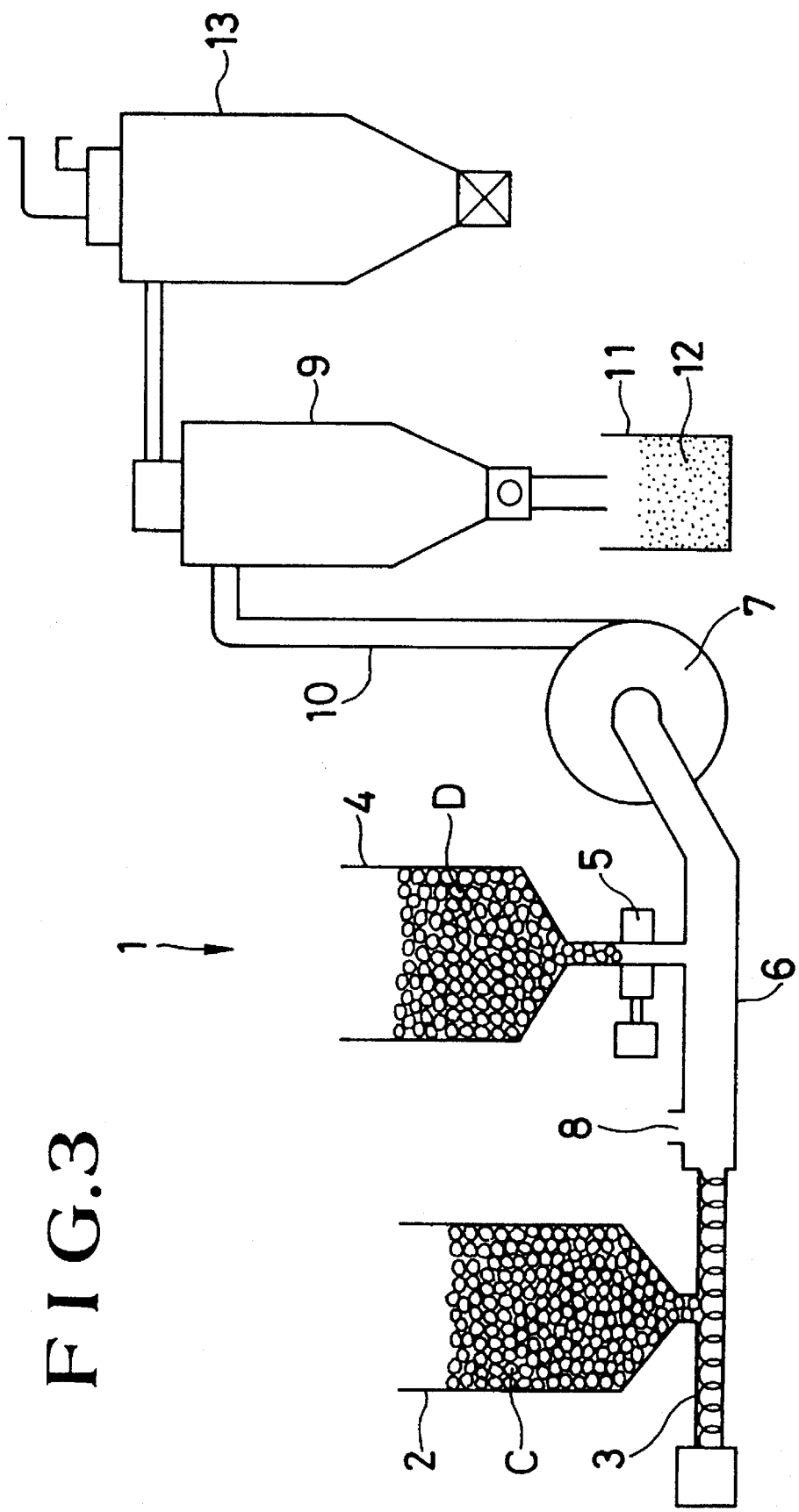
FIG. 3 illustrates a schematic layout of an embodiment of the apparatus to be employed for preparing the powder coating material according to the present invention.

FIG. 3 shows the arrangement of an example of an apparatus for preparing the powder coating material according to the present invention as a schematic layout. In FIG. 3, numeral 1 denotes the apparatus for preparing the powder coating material according to the present invention. The apparatus 1 includes a first hopper 2 for storing the first pelletized component (C), a screw feeder 3 for feeding the pelletized component (C) from the first hopper 2, a second hopper 4 for storing the second pelletized component (D), and autofeeder 5 for feeding the pelletized component (D) from the second hopper 4, a mixer 6 for mixing the pelletized components (C) and (D) supplied thereto and a mill 7 for effecting co-milling of the pelletized components (C) and (D). The mixer 6 realizes mixing of the pelletized components (C) and (D) supplied from the screw feeder and from the autofeeder respectively by a blast of cooled air introduced from an air blast inlet 8 and delivers the resulting mixture to the mill 7. A cyclone 9 is connected to the mill 7 via a duct 10. A product storage 11 is connected to the cyclone 9 to store the powder coating material 12 separated by the cyclone 9. 13 is a bag filter.

In the apparatus shown in FIG. 3, the process for the preparation of the powder coating material according to the present invention is realized by supplying the first pelletized component (C) from the first hopper 2 to the mixer 6 at a constant feed rate by means of the screw feeder 3, while at the same time the second pelletized component (D) is supplied thereto from the second hopper 4 also at a constant feed rate by means of the autofeeder 5. Thus supplied pelletized components (C) and (D) are mixed in the mixer 6 by the blast of cooled air from the air blast inlet 8 and the mixture is fed to the mill 7. The mixture of the pelletized components (C) and (D) is subjected to co-milling in the mill 7 to form a fine and uniform powder. The average particle size can be adjusted by, for example, the rate of revolution of the mill, gap distance and number of the grinding sites and so on. The powder resulting from the co-milling is separated in the cyclone 9 and collected in the storage 11 as the powder coating material 12. The very fine fines not separated in the cyclone 9 are recovered by the bag filter 13.

The powder coating material thus prepared is ready for practical use as such, while it is possible also to subject the so-obtained powder further to a classification. In this case, the cyclone 9 may be replaced by a classifying means for effecting the classification of the powder formed in the mill 7.

EXAMPLES 1–20

Pelletized products as the first component (C) were prepared from the compositions given in Table 1 below. Each specific thermosetting resin, which was a solid at ordinary temperatures, and other additives specified in Table 1 were mixed homogeneously in a dry blender [Henschel Mixer (trademark) of Mitsui Miike Engineering Corp.] for about two minutes. The mixture was then kneaded in an extruder kneader [Buss-co-kneader PR46 (trademark) of Buss AG] at a temperature as specified in Table 1 and the resulting kneaded mass was cooled, whereupon the cooled mass was subjected to a primary crushing to prepare a pelletized product ($C_1$–$C_{15}$).

On the other hand, pelletized products, such as the second pelletized component (D), were prepared also in a similar manner as the pelletized component (C) given above. Each specific constituent of the thermosetting resin was a solid at room temperature, the cellulose ester and other additives specified in Table 2 were processed to obtain pelletized products $D_1$–$D_{17}$.

TABLE 1

| Particulars | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ |
|---|---|---|---|---|---|---|---|---|---|---|---|---|---|---|---|
| Thermosetting Resin (in parts by weight) | | | | | | | | | | | | | | | |
| Epoxy Resin[1] | 100 | | | | | | 50 | 50 | | | | | | | |
| Polyester Resin 1[2] | | 100 | 100 | 100 | 100 | | | | | | | | | | |
| Polyester Resin 2[3] | | | | | | | | | | 100 | | | | | |
| Polyester Resin 3[4] | | | | | | | 50 | 50 | | | | | | | |
| Polyester Resin 4[5] | | | | | | | | | | | 100 | | | | |
| Polyester Resin 5[6] | | | | | | | | | | | | 100 | | | |
| Acrylic Resin 1[7] | | | | | | 100 | | | | | | | | | |
| Acrylic Resin 2[8] | | | | | | | | | | | | | 100 | | |
| Acrylic Resin 3[9] | | | | | | | | | | | | | | 100 | 100 |
| Fluorocarbon resin[10] | | | | | | | | | 100 | | | | | | |
| Additives (in parts by weight) | | | | | | | | | | | | | | | |
| Dicyandiamide | 5 | | | | | | | | | | | | | | |
| Blocked Isocyanate[11] | | 20 | 20 | 20 | 20 | | | | 20 | | | | | | |
| TMMG[12] | | | | | | | | | | 5 | | 6 | | | |
| HAA[13] | | | | | | | | | | | | | 6 | 6 | |
| T.G.I.C.[14] | | | | | | | | | | | 8 | | | | 10 |
| Dodecane Diacid | | | | | | 15 | | | | | | | | | |
| Titanium Dioxide | 40 | 30 | | 5 | 5 | 30 | 40 | 5 | 30 | 40 | 40 | 30 | 30 | 30 | 30 |
| BaSO$_4$ | | 10 | 20 | 5 | 15 | | | 15 | | | | | | | |
| Carbon Black | | | 5 | | | 0.1 | | | | | | | | | |
| Red Iron Oxide | | | | 20 | | | 1.0 | | | | | | | | |
| Cyanine Blue | | | | | 5 | | | | | | | | | | |
| Cyanine Green | | | | | | | | | 5 | | | | | | |
| Kneading Temperature (°C.) | 105 | 105 | 105 | 105 | 105 | 110 | 125 | 120 | 110 | 100 | 110 | 105 | 105 | 105 | 110 |

Notes for Table 1:
[1] EPIKOTE 1004 (trademark) of Yuka Shell Epoxy K.K.; m.p. = 95–105° C., epoxy eq. = 925 g/eq.
[2] ESTERRESIN ER-6610 (trademark) of Nippon Ester Co., Ltd.; a hydroxyl group-containing polyester resin, m.p = 95–105° C., number av. MW = 5,000, hydroxyl value = 31 mg KOH/g
[3] RUCOTE 412 (trademark) of RUCO Polymer Corp.; a hydroxyl group-containing polyester resin, m.p = 95–105° C., number av. MW = 5,500, hydroxyl value = 25 mg KOH/g TABLE 1-continued

|  | Pelletized Product | | | | | | | | | | | | | | |
|---|---|---|---|---|---|---|---|---|---|---|---|---|---|---|---|
| Particulars | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ |

[4] FINEDICK M-8520 (trademark) of Dainippon Ink & Chemicals Inc.; a carboxyl group-contining polyester resin, m.p = 100–110° C., number av. MW = 3,100, acid value = 70 mg KOH/g
[5] URALAC P-3500 (trademark) of DSM Resins BV; a carboxyl group-contining polyester resin, m.p = 95–105° C., number av. MW = 2,900, acid value = 33 mg KOH/g
[6] GRILESTA V-72-12 (trademark) of EMS-CHEMIE AG; a carboxyl group-contining polyester resin, m.p = 90–100° C., number av. MW = 4,500, acid value = 34 mg KOH/g
[7] ALMATEX PD-6200 (trademark) of Mitsui Toatsu Chemicals Inc.; m.p = 100–110° C., number av. MW = 4,700, glycidyl eq. = 730 g/eq.
[8] JONCRYL SCX-800B (trademark) of S. C. Johnson; m.p = 105–115° C., number av. MW = 5,500, acid value = 17 mg KOH/g, hydroxyl value = 40 mg KOH/g
[9] JONCRYL SCX-815B (trademark) of S. C. Johnson; m.p = 100–110° C., number av. MW = 3,700, acid value = 40 mg KOH/g
[10] LUMIFLON LF-710F (trademark) of Asahi Glass Co.; m.p = 100–110° C., number av. MW = 13,000, hydroxyl value = 52 mg KOH/g
[11] ADDUCT B-1065 (trademark) of Hüls AG
[12] POEDERLINK 1174 (trademark) of American Cyanamid Co.; with the structural formula $$\begin{array}{c} CH_3OCH_2 \\ \diagdown \\ N-C-N \\ \diagup \quad | \quad \diagdown \\ O=C \quad C \quad C=O \\ \diagdown \quad | \quad \diagup \\ N-C-N \\ \diagup \quad H \quad \diagdown \\ CH_3OCH_2 \qquad CH_2OCH_3 \end{array}$$

[13] PRIMID XL-552 (trademark) of Rohm & Haas Co.; with the structural formula $$\begin{array}{c} HOCH_2CH_2 \\ \diagdown \\ N-C-CH_2CH_2CH_2CH_2-C-N \\ \diagup \quad \| \qquad\qquad\qquad \| \quad \diagdown \\ HOCH_2CH_2 \quad O \qquad\qquad\qquad O \quad CH_2CH_2OH \end{array}$$

[14] ARALDITE PT-810 (trademark) of Ciba Geigy AG; with the structural formula $$\begin{array}{c} O \\ \| \\ O \qquad\qquad\qquad C \\ \diagup \diagdown \qquad\qquad \diagup \quad \diagdown \\ CH_2\text{—}CH\text{—}CH_2\text{—}N \quad\quad N\text{—}CH_2\text{—}CH\text{—}CH_2 \\ \qquad\qquad\qquad\qquad\qquad O=C \quad C=O \quad O \\ \qquad\qquad\qquad\qquad\qquad\qquad N \\ \qquad\qquad\qquad\qquad\qquad\qquad | \\ \qquad\qquad\qquad\qquad\qquad CH_2\text{—}CH\text{—}CH_2 \\ \qquad\qquad\qquad\qquad\qquad\qquad O \end{array}$$

TABLE 2

| Particulars | Pelletized Product | | | | | | | | | | | | | | | | |
|---|---|---|---|---|---|---|---|---|---|---|---|---|---|---|---|---|---|
|  | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ |
| Thermosetting Resin (in parts by weight) | | | | | | | | | | | | | | | | | |
| Epoxy Resin[1] | 100 | | | | | | 50 | 50 | | | | | | | | | |
| Polyester Resin 1[2] | | 100 | 100 | 100 | 100 | | | | | | | | | | | 100 | 100 |
| Polyester Resin 2[3] | | | | | | | | | 100 | | | | | | | | |
| Polyester Resin 3[4] | | 50 | 50 | | | | 50 | 50 | | | | | | | | | |
| Polyester Resin 4[5] | | | | | | | | | | | | 100 | | | | | |
| Polyester Resin 5[6] | | | | | | | | | | | | | 100 | | | | |
| Acrylic Resin 1[7] | | | | | | 100 | | | | | | | | | | | |
| Acrylic Resin 2[8] | | | | | | | | | | | | | 100 | | | | |
| Acrylic Resin 3[9] | | | | | | | | | | | | | | | 100 | 100 | |
| Fluorocarbon resin[10] | | | | | | | | | | 100 | | | | | | | |
| Additives (in parts by weight) | | | | | | | | | | | | | | | | | |
| Dicyandiamide | 5 | | | | | | | | | | | | | | | | |
| Blocked Isocyanate[11] | | 20 | 20 | 20 | 20 | | | | 20 | | | | | | | 20 | 20 |
| TMMG[12] | | | | | | | | | | | 5 | | | 6 | | | |
| HAA[13] | | | | | | | | | | | | 6 | | | 6 | | |
| T.G.I.C.[14] | | | | | | | | | | | | | 8 | | | | 10 |
| Dodecane Diacid | | | | | | 15 | | | | | | | | | | | |
| Titanium Dioxide | 40 | 30 | | 5 | 5 | 30 | 40 | 5 | 30 | 30 | 40 | 40 | 30 | 30 | 30 | 30 | 40 |
| BaSO$_4$ | | | 20 | 5 | 15 | | | 15 | | 10 | | | | | | | |
| Carbon Black | | | 5 | | | | | | | | | | | | | | |
| Red Iron Oxide | | | | 20 | | | 1 | | | | | | | | | | |
| Cyanine Blue | | | | | 5 | | | | | | | | | | | | |

TABLE 2-continued

| Particulars | Pelletized Product | | | | | | | | | | | | | | | | |
|---|---|---|---|---|---|---|---|---|---|---|---|---|---|---|---|---|---|
| | $D_1$ | $D_2$ | $D_3$ | $D_4$ | $D_5$ | $D_6$ | $D_7$ | $D_8$ | $D_9$ | $D_{10}$ | $D_{11}$ | $D_{12}$ | $D_{13}$ | $D_{14}$ | $D_{15}$ | $D_{16}$ | $D_{17}$ |
| Cyanine Green | | | | | | | | 5 | | | | | | | | | |
| Cellulose Ester (in parts by weight) | | | | | | | | | | | | | | | | | |
| CAB-551-0.01[15] | 3.1 | | | | | | | | | | | | | | | | |
| CAB-551-0.2[16] | | 5.3 | 5.3 | 5.3 | 5.3 | | | | 5.7 | 5.3 | | | | | | | 0.2 |
| CAB-531-1[17] | | | | | | 8.0 | | | | | 5.5 | 7.4 | 3.1 | 5.3 | 4.2 | | |
| CAB-500-1[18] | | | | | | | 4.4 | 4.4 | | | | | | | | | |
| CAP-482-0.5[19] | | | | | | | | | | | | | | | | 4.5 | |
| Mix.-propn. (wt. %)[20] | 3.0 | 5.0 | 5.0 | 5.0 | 5.0 | 7.4 | 4.2 | 4.2 | 5.4 | 5.0 | 5.2 | 6.9 | 3.0 | 5.0 | 4.0 | 4.3 | 0.2 |
| Kneading Temp. (°C.) | 105 | 105 | 105 | 105 | 105 | 105 | 125 | 120 | 110 | 150 | 105 | 110 | 105 | 105 | 110 | 110 | 105 |

Notes for Table 2:
[1] to [14] see the Notes [1] to [14] of Table 1.
[15] Cellulose acetate butyrate of Eastman Chemical Products; m.p. = 127–142° C., hydroxyl group content = 1.5% by weight, viscosity = 0.038 poise
[16] Cellulose acetate butyrate of Eastman Chemical Products; m.p. = 130–140° C., hydroxyl group content = 1.8% by weight, viscosity = 0.76 poise
[17] Cellulose acetate butyrate of Eastman Chemical Products; m.p. = 135–150° C., hydroxyl group content = 1.7% by weight, viscosity = 7.20 poise
[18] Cellulose acetate butyrate of Eastman Chemical Products; m.p. = 165–175° C., hydroxyl group content = 0.5% by weight, viscosity = 3.80 poise
[19] Cellulose acetate propionate of Eastman Chemical Products; m.p. = 188–210° C., hydroxyl group content = 2.9% by weight, viscosity = 1.9 poise
[20] The proportion relative to the total amount of the thermosetting resin and the cellulose ester.

Using the pelletized products for pelletized components (C) and (D) obtained as above, powder coating materials of the compositions given in Table 3 below were prepared in an apparatus corresponding to that shown in FIG. 3. As the mill, Turbomill 400 (trademark) of Turbo Kogyo K.K. as employed. Each pelletized product ($C_1$–$C_{15}$) was fed to the mill, Turbomill 400, together with a selected pelletized product ($D_1$–$D_{17}$) fed by the autofeeder in a predetermined feed proportion, in order to effect the co-milling. Each of the milled pulverous mixtures was sifted through a sieve of 105 μm to obtain a powder coating material. The compositions of the pelletized products for the components (C) and (D) coincide with those of the first and the second resin components respectively.

A steel test panel of a thickness of 0.8 mm was coated with each powder coating material obtained as above, by electrostatic powder coating at a charge voltage of –80 kV each until an average coating thickness given in Table 3 below had been reached, whereupon the coated test panel was cured under the curing conditions given in Table 3. The results of evaluation of the coatings obtained are summarized in Table 3 below.

TABLE 3

| Particulars | Example 1 | Example 2 | Example 3 | Example 4 | Example 5 |
|---|---|---|---|---|---|
| Pelletized Component (C) Product/Part by weight | $C_1$/95 | $C_2$/98 | $C_2$/98 | $C_2$/99 | $C_2$/97 |
| Pelletized Component (D) Product/Part by weight | $D_1$/5 | $D_2$/2 | $D_3$/2 | $D_4$/1 | $D_5$/3 |
| Particle Size (μm) | 105≧ | 105≧ | 105≧ | 105≧ | 105≧ |
| Coating Curing Condition | | | | | |
| Temperature (°C.) | 200 | 190 | 190 | 190 | 190 |
| Time (min.) | 20 | 20 | 20 | 20 | 20 |
| Properties of Coating | | | | | |
| Average thickness (μm) | 50–60 | 50–60 | 50–60 | 50–60 | 50–60 |
| Ridge distance $\underline{d}$ (μm)[22] | 1.0 ± 0.2 | 1.0 ± 0.2 | 1.0 ± 0.2 | 1.0 ± 0.2 | 1.0 ± 0.2 |
| Ridge hight $\underline{h}$ (μm)[23] | 40–70 | 40–70 | 40–70 | 40–70 | 40–70 |
| Minimum thickness $\underline{t}$ (μm)[24] | 25–30 | 25–30 | 25–30 | 25–30 | 25–30 |
| Appearance of coating[25] | Better | Better | Better | Better | Better |
| Hue of ridge portion | White | White | White | White | White |
| Hue of valley portion | White | White | Black | Red Iron | Blue |
| Corrosion resistance[26] | Better | Better | Better | Better | Better |

| Particulars | Example 6 | Example 7 | Example 8 | Example 9 | Example 10 |
|---|---|---|---|---|---|
| Pelletized Component (C) Product/Part by weight | $C_3$/99 | $C_4$/98 | $C_5$/99 | $C_6$/98 | $C_7$/97 |
| Pelletized Component (D) Product/Part by weight | $D_2$/1 | $D_2$/2 | $D_3$/1 | $D_6$/2 | $D_7$/3 |
| Particle Size (μm) | 105≧ | 105≧ | 105≧ | 105≧ | 105≧ |
| Coating Curing Condition | | | | | |
| Temperature (°C.) | 190 | 190 | 190 | 180 | 200 |
| Time (min.) | 20 | 20 | 20 | 20 | 20 |
| Properties of Coating | | | | | |
| Average thickness (μm) | 50–60 | 50–60 | 50–60 | 60–70 | 60–70 |

TABLE 3-continued

| Particulars | | | | | |
|---|---|---|---|---|---|
| Ridge distance $d$ (μm)[22] | 1.0 ± 0.2 | 1.0 ± 0.2 | 1.0 ± 0.2 | 1.0 ± 0.2 | 1.0 ± 0.2 |
| Ridge hight $h$ (μm)[23] | 40–70 | 40–70 | 40–70 | 80–110 | 80–110 |
| Minimum thickness $t$ (μm)[24] | 25–30 | 25–30 | 25–30 | 15–20 | 15–20 |
| Appearance of coating[25] | Better | Better | Better | Better | Better |
| Hue of ridge portion | Black | Red Iron | Blue | Grey | Beige |
| Hue of valley portion | White | White | Black | White | Beige |
| Corrosion resistance[26] | Better | Better | Better | Better | Better |

| Particulars | Example 11 | Example 12 | Example 13 | Example 14 | Example 15 |
|---|---|---|---|---|---|
| Pelletized Component (C) Product/Part by weight | $C_8$/97 | $C_8$/98 | $C_9$/98 | $C_{10}$/97 | $C_{11}$/98 |
| Pelletized Component (D) Product/Part by weight | $D_7$/3 | $D_8$/2 | $D_9$/2 | $D_{10}$/3 | $D_{11}$/2 |
| Particle Size (μm) | 105≧ | 105≧ | 105≧ | 105≧ | 105≧ |
| Coating Curing Condition | | | | | |
| Temperature (°C.) | 200 | 200 | 180 | 180 | 170 |
| Time (min.) | 20 | 20 | 20 | 20 | 20 |
| Properties of Coating | | | | | |
| Average thickness (μm) | 60–70 | 60–70 | 70–80 | 70–80 | 50–60 |
| Ridge distance $d$ (μm)[22] | 1.0 ± 0.2 | 1.0 ± 0.2 | 1.0 ± 0.2 | 1.0 ± 0.2 | 1.0 ± 0.2 |
| Ridge hight $h$ (μm)[23] | 80–110 | 80–110 | 70–100 | 70–100 | 40–70 |
| Minimum thickness $t$ (μm)[24] | 15–20 | 15–20 | 30–35 | 30–35 | 20–30 |
| Appearance of coating[25] | Better | Better | Better | Better | Better |
| Hue of ridge portion | Green | Green | White | White | White |
| Hue of valley portion | Beige | Green | White | White | White |
| Corrosion resistance[26] | Better | Better | Better | Better | Better |

| Particulars | Example 16 | Example 17 | Example 18 | Example 19 | Example 20 |
|---|---|---|---|---|---|
| Pelletized Component (C) Product/Part by weight | $C_{12}$/98 | $C_{13}$/98 | $C_{14}$/96 | $C_{15}$/97 | $C_2$/97 |
| Pelletized Component (D) Product/Part by weight | $D_{12}$/2 | $D_{13}$/2 | $D_{14}$/4 | $D_{15}$/3 | $D_{16}$/3 |
| Particle Size (μm) | 105≧ | 105≧ | 105≧ | 105≧ | 105≧ |
| Coating Curing Condition | | | | | |
| Temperature (°C.) | 180 | 170 | 170 | 180 | 180 |
| Time (min.) | 20 | 20 | 20 | 20 | 20 |
| Properties of Coating | | | | | |
| Average thickness (μm) | 50–60 | 50–60 | 50–60 | 50–60 | 50–60 |
| Ridge distance $d$ (μm)[22] | 1.0 ± 0.2 | 1.0 ± 0.2 | 1.0 ± 0.2 | 1.0 ± 0.2 | 1.0 ± 0.2 |
| Ridge hight $h$ (μm)[23] | 40–70 | 40–70 | 40–70 | 40–70 | 40–70 |
| Minimum thickness $t$ (μm)[24] | 20–30 | 20–30 | 20–30 | 20–30 | 20–30 |
| Appearance of coating[25] | Better | Better | Better | Better | Better |
| Hue of ridge portion | White | White | White | White | White |
| Hue of valley portion | White | White | White | White | White |
| Corrosion resistance[26] | Better | Better | Better | Better | Better |

Note:
[22] The distance $d$ between one ridge peak around a valley to the neighboring ridge peak for any voluntary valley is in the range given.
[23] The height $h$ of any ridge of the wrinkle falls under the range given.
[24] The minimum thickness $t$ from the substrate face to the lowermost bottom face of any valley portion falls under the range given.
[25] Evaluation of the appearance is based on the criterium:
Better: $d$ = 1.0 ± 0.2 mm, $h$ = 40–180 μm, $t$ = 10–30 μm, with superior aesthetic appearance having a uniform and dense distribution of wrinkle pattern
Worse: not corresponding to the above
[26] According to JIS K-5400 (1990) 9.1 with test duration of 500 hrs. Evaluation was based on the criterium:
Better: no swelling nor peel-off of the coating layer, showing no ruster formation
Worse: swelling and peel-off occur

Comparative Examples 1–6

In these Comparative Examples 1–6, one of the pelletized products $C_2$, $D_2$, $D_{10}$ and $D_{17}$ obtained in Examples 1–20 was each isolately subjected to milling in the same Turbomill 400 without effecting co-milling to obtain each powder coating material.

Thus, Comparative Examples 1, 2 and 5 show the cases in which each respective milled powder is sifted by a sieve of 105 μm to obtain each corresponding powder coating material. In Comparative Example 3, the milled powder was sifted by a sieve of 105 μm and TROYKYD PTA (trademark) of Troy Chemical was added to the so-sifted powder in the proportion given in Table 4 to obtain the powder coating material. In Comparative Example 4, the milled powder was sifted by two sieves of (a) 74 μm and (b) 250 μm respectively and the so-sifted powders were mixed together in a weight proportion of (a):(b) of 10:1 to obtain the powder coating material. In Comparative Example 6, two powders obtained by milling pelletized products $C_2$ and $D_2$ each independently without subjecting to co-milling were simply mixed together in a weight proportion of $C_2$:$D_2$ of 100:0.3 to obtain the powder coating material.

These powder coating materials prepared were employed for coating test panels in the same manner as Examples 1–20, of which results of evaluation are summarized in Table 4.

pendently by milling different pelletized product without subjecting to co-milling.

We claim:

1. A power coating material for providing a crepe-like

TABLE 4

| Particulars | Compar. Example 1 | Compar. Example 2 | Compar. Example 3 | Compar. Example 4 | Compar. Example 5 | Compar. Example 6 |
|---|---|---|---|---|---|---|
| Composn. (part by wt.) | | | | | | |
| $C_1$ | — | — | — | — | — | — |
| $C_2$ | — | — | 100 | 100 | — | 100 |
| $C_3$ | — | — | — | — | — | — |
| $C_4$ | — | — | — | — | — | — |
| $C_5$ | — | — | — | — | — | — |
| $D_1$ | — | — | — | — | — | — |
| $D_2$ | 100 | — | — | — | — | 0.3 |
| $D_3$ | — | — | — | — | — | — |
| $D_4$ | — | — | — | — | — | — |
| $D_5$ | — | — | — | — | — | — |
| $D_{10}$ | — | 100 | — | — | — | — |
| $D_{17}$ | — | — | — | — | 100 | — |
| TROYKYD PTA[27] | — | — | 0.5 | — | — | — |
| Particle Size (μm) | 105≧ | 105≧ | 105≧ | [28] | 105≧ | 105≧ |
| Curing Condition | | | | | | |
| Temperature (°C.) | 190 | 190 | 190 | 190 | 190 | 190 |
| Time (min.) | 20 | 20 | 20 | 20 | 20 | 20 |
| Properties of Coating | | | | | | |
| Av. thick. (μm) | 50–60 | 50–60 | 60–70 | 60–70 | 70–80 | 70–80 |
| Ridge dist. $\underline{d}$ (μm)[22] | 1.0 ± 0.6 | 1.0 ± 0.4 | 1.0 ± 0.6 | 1.0 ± 0.4 | 1.0 ± 0.6 | 1.0 ± 0.6 |
| Ridge hight $\underline{h}$ (μm)[23] | 40–120 | 20–40 | 80–140 | 20–40 | 40–160 | 40–160 |
| Min. thick. $\underline{t}$ (μm)[24] | 0–30 | 30–40 | 0–20 | 40–50 | 0–30 | 0–30 |
| Appear. of coat.[25] | Worse | Worse | Worse | Worse | Worse | Worse |
| Hue of ridge portion | White | White | White | White | White | White |
| Hue of valley portion | White | White | White | White | White | White |
| Corrosion resist.[26] | Worse | Better | Worse | Better | Worse | Worse |

Notes
[22] to [26] see the notes for Table 3
[27] A product (trademark) of TROY CHEMICAL CORPORATION for an additive for imparting a crepe-like pattern of the coating obtained.
[28] Obtained by sifting by seives of 74 μm and 250 μm and mixing the resulting powders in a weight proportion of 10:1.

As seen from Table 3, the coatings according to the present invention as obtained in Examples 1–20 exhibited better aesthetic crepe-like appearances and higher corrosion resistances, whereas the coatings of the Comparative Examples were insufficient in aesthetic appearance and exhibited poor corrosion resistances, except those of Comparative Examples 2 and 4, wherein Comparative Examples 1 and 5 represent the case in which the powder coating material is prepared by kneading a thermosetting resin product and a cellulose ester product at a temperature at which the cellulose ester product does not melt (Comparative Example 5 corresponds to the disclosure of Japanese Patent Application Kokai No. 46739/1975); Comparative Example 2 shows the case in which the powder coating material is prepared by kneading a thermosetting resin product and a cellulose ester product at a temperature at which the cellulose ester product melts; Comparative Example 3 represents the case in which the powder coating material is prepared by admixing a powdery additive for forming a crepe-like pattern to a thermosetting resin powder; Comparative Example 4 shows the case in which the powder coating material is prepared by simply mixing two powder products of different average particle sizes from a thermosetting resin (corresponding to Japanese Patent Publication No. 7686/1973); and Comparative Example 6 represents the case in which the powder coating material is prepared by simply mixing two powder products, each obtained independently by milling different pelletized product without subjecting to co-milling.

We claim:

1. A power coating material for providing a crepe-like pattern coating, comprising a co-milled pulverous mass with particle sizes not higher than 105 μm, which is composed of
   (A) 95–99.5 parts by weight of a first pelletized resin component comprising a first thermosetting resin which is a solid at room temperature, for the powder coating material and
   (B) 5–0.5 parts by weight of a second pelletized resin component comprising a second thermosetting resin which is a solid at room temperature and contains 3–8% by weight of a cellulose ester, for the powder coating material, said second pelletized resin component being distributed uniformly over said first pelletized resin component.

2. A powder coating material according to claim 1, wherein the first and/or the second resin components contain the same or each different coloring material each in an amount of 1–40% by weight.

3. A powder coating material according to claim 1, wherein the first and/or second resin components contain a curing agent in an amount of 2–50% by weight, based on the weight of the thermosetting resin.

4. A powder coating material according to claim 1, wherein the thermosetting resin used in the first and/or second resin components is one or more members selected from the group consisting of an epoxy resin having a melting point of 60°–110° C., a carboxyl group-containing polyester resin having a melting point of 60°–125° C., a hydroxyl group-containing polyester resin having a melting point of 60°–125° C., an acrylic resin having a melting point of 60°–120° C., a carboxyl group-containing acrylic resin having a melting point of 60°–125° C., a hydroxyl group-containing acrylic resin having a melting point of 60°–125° C. and a hydroxyl group-containing fluorocarbon resin having a melting point of 60°–120° C.

5. A method for preparing a crepe-like coating, comprising applying a powder coating material onto a substrate and heating the coated layer of the powder coating material to melt to cause curing thereof, said powder coating material being a co-milled pulverous mass with particle sized not higher than 105 µm, which is composed of
    (A) 95–99.5 parts by weight of a first pelletized resin component comprising a first thermosetting resin which is a solid at room temperature, for the powder coating material and
    (B) 5–0.5 parts by weight of a second pelletized resin component comprising a second thermosetting resin which is a solid at room temperature and contains 3–8% by weight of a cellulose ester, for the powder coating material, said second pelletized resin component being uniformly distributed over said first resin component.

6. A coating exhibiting a crepe-like pattern, which is made from a powder coating material, said powder coating material being a co-milled pulverous mass with particle sizes not higher than 105 µm, which is composed of
    (A) 95–99.5 parts by weight of a first pelletized resin component comprising a first thermosetting resin which is a solid at room temperature, for the powder coating material and
    (B) 5–0.5 parts by weight of a second pelletized resin component comprising a second thermosetting resin which is a solid at room temperature and contains 3–8% by weight of a cellulose ester, for the powder coating material, said second pelletized resin component being uniformly distributed over said first resin component.

* * * * *

UNITED STATES PATENT AND TRADEMARK OFFICE
CERTIFICATE OF CORRECTION

PATENT NO. : 5 498 663
DATED : March 12, 1996
INVENTOR(S) : Eiji Shimada et al

It is certified that error appears in the above-indentified patent and that said Letters Patent is hereby corrected as shown below:

Column 20, line 4; change "power" to ---powder---.

Signed and Sealed this

Twenty-third Day of July, 1996

BRUCE LEHMAN

*Attest:*

*Attesting Officer*       *Commissioner of Patents and Trademarks*